United States Patent [19]

Blackledge et al.

[11] 3,735,999
[45] May 29, 1973

[54] MOTOR VEHICLE SUSPENSIONS
[75] Inventors: Keith Blackledge, Longton; Harold Rushton, New Longton, both of England
[73] Assignee: British Leyland Truck and Bus Division Limited, Leyland, Lancashire, England
[22] Filed: Aug. 13, 1971
[21] Appl. No.: 171,712

[52] U.S. Cl. ..................................280/124 F, 267/15 A
[51] Int. Cl. ...............................................B60p 1/16
[58] Field of Search......................280/124 F, 124 R, 280/112 R; 267/15 A, 66, 67

[56] References Cited

UNITED STATES PATENTS

| | | | |
|---|---|---|---|
| 2,859,047 | 11/1958 | Easton | 280/124 F |
| 2,941,817 | 6/1960 | Benson | 280/124 F |
| 3,606,375 | 9/1971 | Jackson | 280/124 F |

*Primary Examiner*—Philip Goodman
*Assistant Examiner*—John A. Carroll
*Attorney*—Harold T. Stowell, Harold L. Stowell and Thomas J. Greer, Jr.

[57] ABSTRACT

The front rigid axle of a public service vehicle is located by two leading arms. The leading end of each arm is rigidly attached to the axle and the trailing end is pivotably attached to the vehicle body. Suspension elements, such as air or coil springs, are interposed between the vehicle body and the axle and leading end of each arm.

3 Claims, 1 Drawing Figure

Patented May 29, 1973 3,735,999
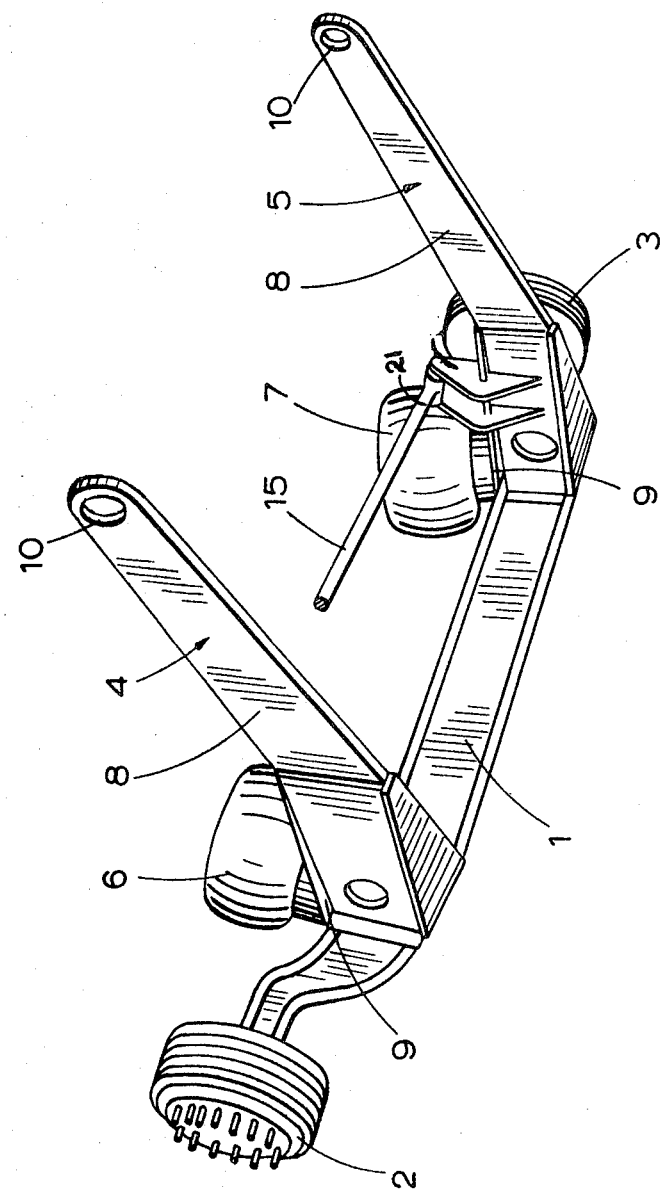

MOTOR VEHICLE SUSPENSIONS

FIELD OF THE INVENTION

The present invention relates to motor vehicle suspensions and is more particularly concerned with a front suspension which is suitable for a public service vehicle.

SUMMARY OF THE INVENTION

According to one aspect of the present invention a motor vehicle front suspension comprises:
- a. a wheel carrier made up of a rigid axle with two leading arms each leading arm having its leading end rigidly attached to the axle and its trailing end adapted for pivotal connection to the sprung mass of the vehicle; and
- b. suspension elements interposed between the sprung mass of the vehicle and the wheel carrier.

According to a first feature of the invention the two leading arms extend substantially parallel to one another and to the longitudinal axis of the vehicle.

According to a second feature of the invention each suspension element acts on the wheel carrier by way of a platform adjacent each junction between leading arm and axle.

According to a third feature of the invention the platform is secured to the axle, in two directions leading arm or both at right angles to one another in order to provide rigidity in the platform.

According to a fourth feature of the invention the suspension element comprises an air spring or a coil spring.

According to a fifth feature of the invention at least one of the leading arms has a transverse radius arm adapted for connecting the leading arm to the sprung mass of the vehicle in order to locate the axle laterally of the vehicle.

BRIEF DESCRIPTION OF THE DRAWING

How the invention may be carried out will now be described by way of example only, with reference to the accompanying drawing which is a diagrammatic underside perspective view of a suspension constructed according to the present invention.

DESCRIPTION OF A PREFERRED EMBODIMENT

A public service vehicle has a rigid front axle 1 which has two steerable road wheels 2 and 3 respectively mounted on its ends. The axle 1 is connected to the sprung mass of the vehicle (not shown) by two leading arms 4 and 5 respectively which are substantially parallel to one another and to the longitudinal axis of the vehicle.

Two air springs 6 and 7 are interposed between the leading arms 4 and 5 and the sprung mass of the vehicle.

Each of the leading arms comprises a metal web 8 which carries a metal platform 9 at its leading end and has an aperture 10 extending horizontally and normally to the plane of the web 8 at its trailing end through which the arm is pivotally connected to the underframe of the vehicle.

The air springs 6 and 7 are mounted on the platforms 9. Hydraulic dampers 11 are also connected between portions 9a of the platforms 9 and the sprung mass of the vehicle.

Each platform 9 is secured to the axle 1 and the metal web 8 on axes which are substantially at right angles to one another in order to provide rigidity in the platform 9.

A Panhard rod 15 has one end connected to the arm 5 and has its other end connected to the sprung mass of the vehicle in order to locate the axle 1 laterally.

By employing the two trailing arms 4 and 5 and securing the air springs 6 and 7 directly on the platforms 9 it is possible to provide a public service vehicle with a lower floor than would otherwise be the case.

We claim:
1. A motor vehicle front suspension including:
   - a. a rigid transverse axle adapted to carry at its ends steerable road wheels;
   - b. first and second mutually parallel arms having means rigidly securing their forward ends to said axle;
   - c. each said arm comprising a metal web lying in a substantially vertical plane and adapted to extend longitudinally of a vehicle and extending rearwardly from said axle;
   - d. means pivotally connecting each of the trailing ends of said arms to a sprung mass of the vehicle;
   - e. platforms formed on the leading ends of said arms and on said axle;
   - f. spring elements mounted on said platforms and adapted to lie between them and the sprung mass of a vehicle.

2. A motor vehicle front suspension as claimed in claim 1 in which each said platform is secured to a leading arm and said axle in two directions at right angles to one another to provide rigidity in the platform.

3. A motor vehicle front suspension as claimed in claim 1 including a transverse arm, means connecting one end of the transverse arm to one of said leading arms, the other end of said transverse arm adapted to be connected to the sprung mass of a vehicle.

* * * * *